United States Patent
Ido (10) Patent No.: US 10,452,119 B2
(45) Date of Patent: Oct. 22, 2019

(54) CONTROL DEVICE AND CONTROL METHOD FOR CONTROLLING COMMUNICATION APPARATUS

(71) Applicant: CANON KABUSHIKI KAISHA, Tokyo (JP)

(72) Inventor: Tetsuo Ido, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 15/707,930

(22) Filed: Sep. 18, 2017

(65) Prior Publication Data

US 2018/0081418 A1 Mar. 22, 2018

(30) Foreign Application Priority Data

Sep. 20, 2016 (JP) ................................. 2016-182954

(51) Int. Cl.
| | |
|---|---|
| *G06F 1/3234* | (2019.01) |
| *G06F 9/06* | (2006.01) |
| *H04L 12/28* | (2006.01) |
| *H04L 29/12* | (2006.01) |

(52) U.S. Cl.
CPC .......... *G06F 1/3234* (2013.01); *G06F 1/3278* (2013.01); *G06F 9/06* (2013.01); *H04L 12/28* (2013.01); *H04L 61/2007* (2013.01); *H04L 61/2053* (2013.01); *H04L 61/2092* (2013.01); *H04L 61/6059* (2013.01); *H04L 61/2015* (2013.01); *Y02D 10/157* (2018.01)

(58) Field of Classification Search
CPC ........ G06F 1/3234; G06F 1/3278; G06F 9/06; H04L 61/6059; H04L 61/2053; H04L 12/28; H04L 61/2092; H04L 61/2007; H04L 61/2015; Y02D 10/157

See application file for complete search history.

(56) References Cited

U.S. PATENT DOCUMENTS

| | | | | |
|---|---|---|---|---|
| 9,176,566 | B2 * | 11/2015 | Okazaki ................ | G06F 1/3234 |
| 2003/0140345 | A1 * | 7/2003 | Fisk ................... | H04L 29/06027 725/78 |
| 2003/0219023 | A1 * | 11/2003 | Miyata .............. | H04L 29/12358 370/395.53 |

(Continued)

FOREIGN PATENT DOCUMENTS

JP 2009-027348 A 2/2009

*Primary Examiner* — Ivan O Latorre
(74) *Attorney, Agent, or Firm* — Canon U.S.A., Inc. IP Division (57) ABSTRACT

A control device for controlling a communication apparatus having a first operation mode in which power with which a network communication function is operable is supplied, and a second operation mode in which power with which an operation of at least part of the network communication function is restricted is supplied, the control device includes a first determination unit configured to determine whether a packet received in the second operation mode is a packet for use in generating an Internet Protocol (IP) address, and a control unit configured to, in a case where the first determination unit determines that the received packet is not a packet for use in generating an IP address, control the communication apparatus not to shift from the second operation mode to the first operation mode.

14 Claims, 5 Drawing Sheets

(56) References Cited

U.S. PATENT DOCUMENTS

| | | | |
|---|---|---|---|
| 2007/0242623 A1* | 10/2007 | Uchikawa | H04L 12/66 370/254 |
| 2009/0296685 A1* | 12/2009 | O'Shea | H04L 69/32 370/351 |
| 2010/0229030 A1* | 9/2010 | Shouno | H04L 29/12273 714/5.1 |
| 2011/0164615 A1* | 7/2011 | Ito | H04L 29/12113 370/390 |
| 2012/0117404 A1* | 5/2012 | Lorch | G06F 1/3228 713/323 |
| 2013/0003577 A1* | 1/2013 | Gupta | H04W 52/0225 370/252 |
| 2013/0054789 A1* | 2/2013 | Bajamahal | H04L 41/0873 709/224 |
| 2013/0097691 A1* | 4/2013 | Tanji | H04L 63/0236 726/13 |
| 2013/0179715 A1* | 7/2013 | Sun | G06F 1/3234 713/323 |
| 2013/0326086 A1* | 12/2013 | Hamachi | H04L 61/2007 709/245 |
| 2014/0029459 A1* | 1/2014 | Kwon | H04W 76/28 370/252 |
| 2014/0063527 A1* | 3/2014 | Takagi | H04N 1/00344 358/1.13 |
| 2014/0380074 A1* | 12/2014 | Kimura | G06F 1/324 713/322 |
| 2015/0215165 A1* | 7/2015 | Ohsuga | H04L 41/0859 709/221 |
| 2015/0222542 A1* | 8/2015 | Inada | H04L 45/52 370/395.52 |
| 2016/0014071 A1* | 1/2016 | Asati | H04L 61/6063 709/245 |
| 2017/0005981 A1* | 1/2017 | Wang | H04L 45/64 |
| 2019/0089558 A1* | 3/2019 | Hirose | H04L 12/40091 |

* cited by examiner

CONTROL DEVICE AND CONTROL METHOD FOR CONTROLLING COMMUNICATION APPARATUS

BACKGROUND

Field of the Disclosure

The present disclosure relates to a control device and a control method for controlling a communication apparatus.

Description of the Related Art

In recent years, there has been a growing demand for power saving. Thus, an apparatus having the following mechanism has come to be commonly used. The mechanism works in such a manner that when an apparatus is not used, the mechanism shifts the apparatus to a standby mode in which the amount of consumed power is kept low, and when a necessary task occurs, the mechanism shifts the apparatus to a normal mode, which is an operation state where the normal amount of power is consumed.

Further, as a method for shifting an apparatus from a standby mode to a normal mode by a remote operation, a dedicated remote controller using an infrared communication function has been generally used until now. In recent years, some of the apparatuses having a network communication function using a wired local area network (LAN) or a wireless LAN and capable of shifting from a standby mode to a normal mode by a remote operation using a network communication function have become available. A standby mode of an apparatus having such a network communication function is also sometimes referred to as a "network standby mode".

Examples of the network standby mode include a mode in which, while all the functions of the apparatus are operable, clocks are slowed down to degrade the performance of the functions, thereby achieving a power saving state. Further, examples of the network standby mode include the mode in which the supply of power and clocks to components other than the network communication function units is stopped and the use of only part of a memory is allowed, thereby achieving further power saving. In such a case, it is also necessary to implement a small-sized program to be used in the network standby mode. This leads to the state where only part of the network communication function can be executed in the network standby mode.

Meanwhile, to communicate with another apparatus on a network, each apparatus needs to have an Internet Protocol (IP) address. Some IP addresses have an expiration date. Thus, it is necessary to manage the IP address by performing the process of extending the expiration date where necessary, and performing control so that the expired IP address is not used.

As described above, the apparatus in the network standby mode can execute only part of the network communication function due to the limitation of resources. Thus, some apparatus may not have the function of managing the IP address expiration date in the network standby mode. In other words, some of the apparatuses have the function of managing the IP address expiration date only in the normal mode.

A technique for acquiring an IP address from a Dynamic Host Configuration Protocol (DHCP) server in a normal mode, thereafter setting to a wake-up timer a time determined according to an IP address expiration date, and then shifting to a network standby mode is discussed in Japanese Patent Application Laid-Open No. 2009-27348. In Japanese Patent Application Laid-Open No. 2009-27348, if the wake-up timer has timed out, the apparatus shifts to the normal mode and transmits a request to extend the IP address expiration date.

By such a technique, the apparatus can manage the IP address expiration date without having the function of managing the IP address expiration date in the network standby mode.

As described above, an apparatus can acquire an IP address using a DHCP server. Further, the apparatus can acquire an IP address by an Internet Protocol version 6 (IPv6) address automatic configuration function, if using the IPv6 standard. In the following description, an IP address generated by the IPv6 address automatic configuration function is referred to as an "IPv6 automatic configuration address" (or simply as an "IPv6 address").

This IPv6 automatic configuration address also has an expiration date. Thus, it is necessary to manage the IPv6 automatic configuration address so that the expired IPv6 automatic configuration address is not used.

The apparatus can generate an IP address (hereinafter referred to as a "temporary IP address") based on prefix information attached to a router advertisement packet. Using a duplicate address detection function, the apparatus confirms whether another apparatus having the same temporary IP address is present on a network. If it is confirmed that the temporary IP address is not used by another apparatus, the apparatus newly registers the temporary IP address as an IPv6 automatic configuration address of the apparatus. At this time, the apparatus determines the expiration date of the IPv6 automatic configuration address based on prefix expiration date information attached to the router advertisement packet.

Further, if the apparatus already has the same IP address (IPv6 automatic configuration address) in the apparatus when generating the temporary IP address, the apparatus updates the expiration date of the IPv6 automatic configuration address already owned by the apparatus (instead of newly registering the generated temporary IP address).

As described above, in the mechanism of an IPv6 address automatic configuration, the role of a router advertisement packet differs depending on the management state of an IP address of an apparatus that has received the router advertisement packet.

In the conventional art, a wake-up timer is used according to an IP address expiration date. If the time to make a request to extend the expiration date arrives, an apparatus shifts from a network standby mode to a normal mode and performs processing. Further, the apparatus wakes up in the normal mode and then processes a packet that cannot be processed in the network standby mode. In the case of an IPv6 automatic configuration address, however, this technique alone causes a problem in the following case.

This problem arises in an apparatus not having the function of setting the wake-up timer according to the IP address expiration date for managing the IP address expiration date in the network standby mode. More specifically, every time the apparatus receives a router advertisement packet in the network standby mode, the apparatus shifts to the normal mode even if the apparatus does not actually need to shift to the normal mode. As a result, power saving effects are reduced.

More specifically, if the processing to be performed when this router advertisement packet is received is the update of an IP address expiration date, the apparatus does not need to shift to the normal mode. This is because the wake-up timer manages the IP address expiration date. Thus, the apparatus needs to shift to the normal mode only when the apparatus newly registers an IP address. If the apparatus shifts to the normal mode in other cases, this results in reduction of power saving effects.

If, on the other hand, the apparatus ignores a router advertisement packet received in the network standby mode, the following inconvenience occurs. This is a case where, in the network standby mode, prefix information is replaced with that of a router device different from the past one. Other apparatuses on a network can each generate a new IP address based on a router advertisement packet from the new router device, and other apparatuses can communicate with each other. However, in the case of the apparatus that ignores a router advertisement packet and shifts to the normal mode only by the wake-up timer, the apparatus uses an old IP address until the wake-up timer times out. As a result, communication with other apparatuses stops. In other words, the apparatus cannot receive a wake-up trigger packet transmitted from another apparatus to wake up the apparatus from the network standby mode, and an inconvenience occurs to the apparatus and a user.

SUMMARY

The present disclosure is directed to a control device for preventing a reduction in the power saving effects of a communication apparatus.

According to an aspect of the present disclosure, a control device for controlling a communication apparatus having a first operation mode in which power with which a network communication function is operable is supplied, and a second operation mode in which power with which an operation of at least part of the network communication function is restricted is supplied, the control device includes a first determination unit configured to determine whether a packet received in the second operation mode is a packet for use in generating an Internet Protocol (IP) address, and a control unit configured to, in a case where the first determination unit determines that the received packet is not a packet for use in generating an IP address, control the communication apparatus not to shift from the second operation mode to the first operation mode.

Further features of the present disclosure will become apparent from the following description of exemplary embodiments with reference to the attached drawings.

DESCRIPTION OF THE EMBODIMENTS

A communication apparatus according to exemplary embodiments of the present disclosure will be described in detail below with reference to the drawings. The technical scope of the present disclosure is determined by the appended claims, and is not limited by the following exemplary embodiments. For example, the configurations of the exemplary embodiments can be appropriately modified or changed depending on the specifications of an apparatus to which the present disclosure is applied, or various conditions (the use conditions and the use environment).

In a first exemplary embodiment, a description is given of the management of an Internet Protocol (IP) address expiration date of a communication apparatus having a power saving mode for disabling all functions except for some network functions. In the present exemplary embodiment, a projector is described as an example of the communication apparatus.

<Configuration of Functional Blocks of Projector 1>

First, the configuration of functional blocks of a projector 1 will be described with reference to FIG. 1.

The projector 1 includes a processing control unit 10, an image processing unit 11, an application processing unit 12, a network communication processing unit 13, an IP address management unit 15, a mode shift control unit 19, and a wake-up timer 20. Among these components, the processing control unit 10, the network communication processing unit 13, and the IP address management unit 15 are functional units configuring a network communication function of the projector 1. The projector 1 can operate in either of a normal mode and a network standby mode. When the projector 1 is in the normal mode, power is supplied so that the entire network communication function is operable. Further, when the projector 1 is in the network standby mode, power is supplied so that only part of the network communication function is operable. In other words, in the network standby mode, power is supplied so that the operation of part of the network communication function of the projector 1 is restricted. Among the functional units configuring the network communication function illustrated in FIG. 1, functional units operable even in the network standby mode include part of the processing control unit 10, the network communication processing unit 13, the packet determination unit 14, the temporary IP address generation unit 17, and the IP address comparison unit 18. If the state where the projector 1 has no task of projecting an image continues for a predetermined time, the projector 1 shifts from the normal mode to the network standby mode. The projector 1 can connect to a network N.

The processing control unit 10 controls the entire processing of the projector 1 and controls the processing order of processing blocks.

Figure 5:
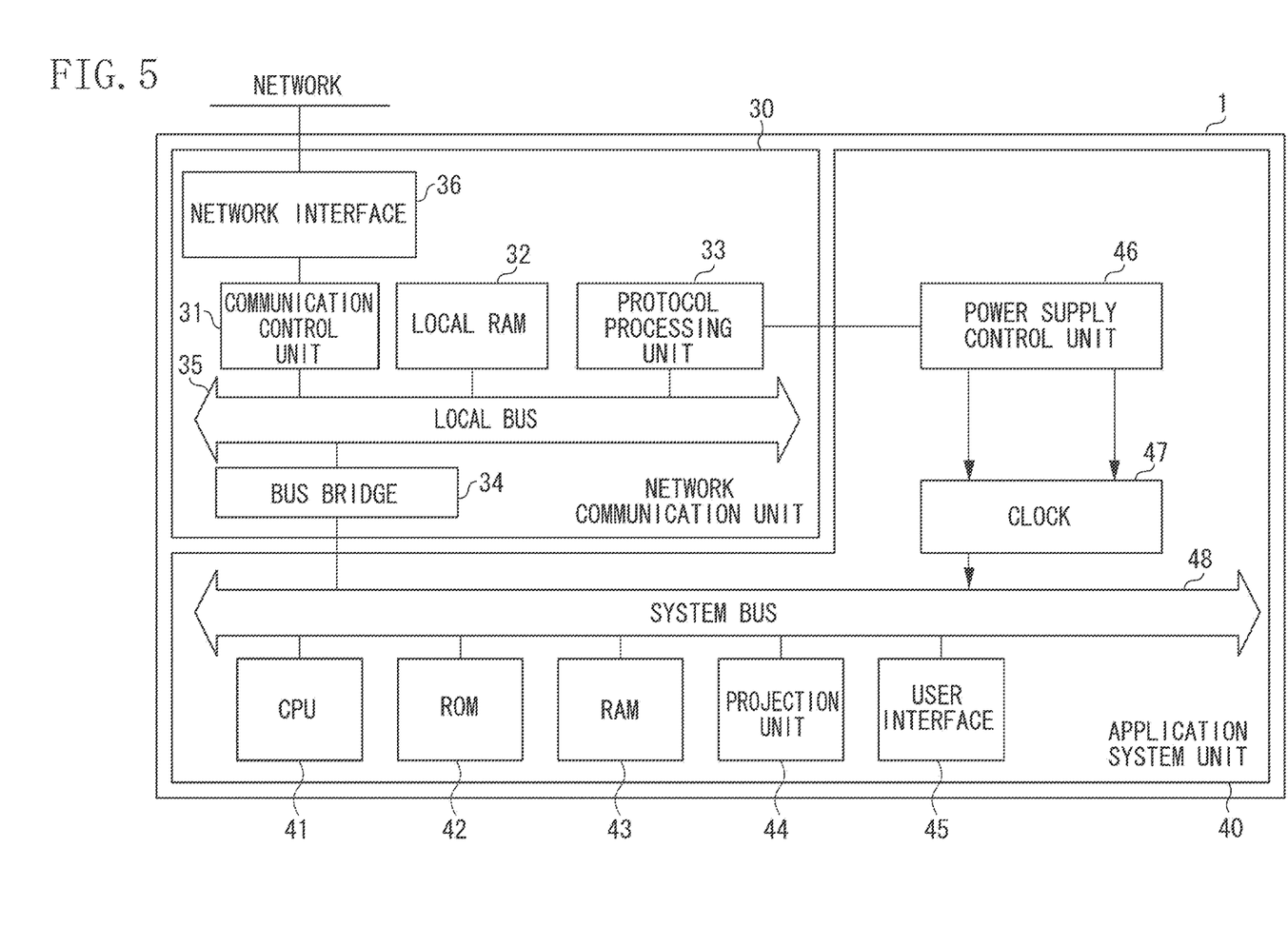
FIG. 5 is a block diagram illustrating a hardware configuration of the projector according to one or more aspects of the present disclosure.

The image processing unit 11 converts image data into projection data to be projected by a projection unit 44 in FIG. 5.

The application processing unit 12 executes an application program for performing processing according to an operation and an input by a user. Further, the application processing unit 12 also executes an application program for performing the process of managing image data or managing communication settings, which is performed voluntarily by the projector 1 instead of a user operation.

The network communication processing unit 13 executes network communication processing. More specifically, the network communication processing unit 13 executes Transmission Control Protocol (TCP) protocol processing, User Datagram Protocol (UDP) protocol processing, IP protocol processing, and physical layer/media access control (PHY/MAC) protocol processing. The network communication processing unit 13 includes a packet determination unit 14.

The packet determination unit 14 determines whether a packet received from the network N is a packet for use in generating an IP address or a packet for use in updating an IP address expiration date.

The IP address management unit 15 holds an IP address of the projector 1 and an IP address of a communication partner apparatus. The projector 1 can have a plurality of IP addresses, and the IP address management unit 15 can also hold a plurality of IP addresses. Further, the IP address management unit 15 can also hold IP addresses of a plurality of communication partner apparatuses. The IP address management unit 15 includes an IP address registration unit 16, a temporary IP address generation unit 17, and an IP address comparison unit 18.

The IP address registration unit 16 receives a request to newly hold an IP address, and performs management control so that the IP address management unit 15 holds the IP address for which the request is made.

The temporary IP address generation unit 17 generates an IP address using prefix information attached to a received packet for use in generating an IP address. The generated IP address is an IP address before being subjected to the registration management of the IP address management unit 15 and therefore is referred to as a "temporary IP address".

The IP address comparison unit 18 compares a temporary IP address with IP addresses of the projector 1 held in the IP address management unit 15 and determines whether there is an IP address that coincides with the temporary IP address.

The mode shift control unit 19 controls the shift of the operation mode of the projector 1. That is, the mode shift control unit 19 controls the shift of the operation mode between the normal mode in which power is supplied so that the entire network communication function is operable and the network standby mode in which power is supplied so that only part of the network communication function is operable.

The wake-up timer 20 notifies the mode shift control unit 19 that the time to shift from the network standby mode to the normal mode has arrived. For example, the wake-up timer 20 is set to a time according to an IP address expiration date.

<Network Configuration>

A network configuration according to the present exemplary embodiment will be described with reference to FIG. 2. An example will be described where the projector 1 is connected to another communication apparatus via a network.

Figure 2:
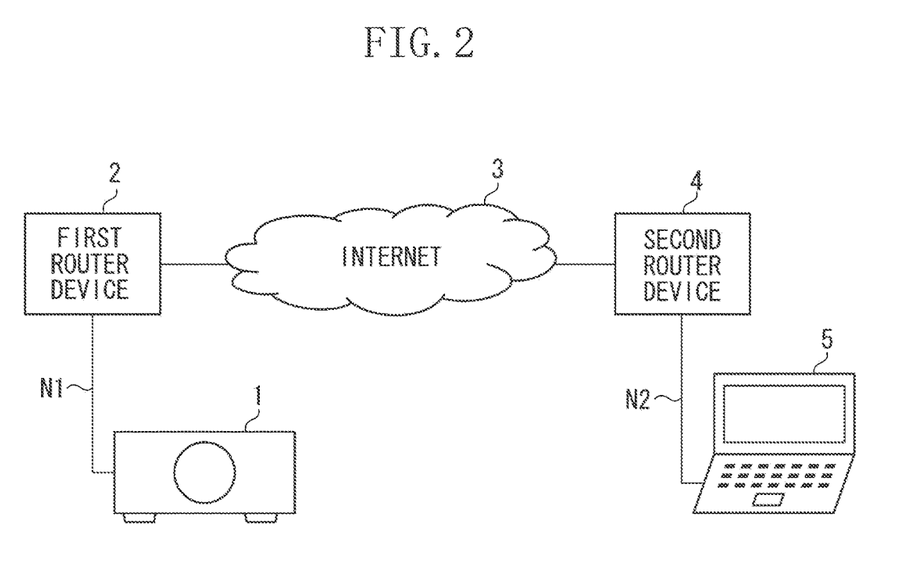
FIG. 2 is a diagram illustrating an example of a network configuration including the projector in FIG. 1 according to one or more aspects of the present disclosure.

In the example of FIG. 2, the projector 1 is connected to a first wired local area network (LAN) N1 using a network interface 36 (illustrated in FIG. 5, e.g., a 1000BASE-T Ethernet module). On the first wired LAN N1, a first router device 2 is present. The first router device 2 is connected to the Internet 3. Beyond the Internet 3, a second router device 4 is present on a second wired LAN N2. On the second wired LAN N2, a personal computer (PC) 5 is present. In this network configuration, the first router device 2 and the second router device 4 are used as gateways.

The network configuration in FIG. 2 allows, in a remote conference, image data on a monitor screen of the PC 5 to be transferred to the projector 1 via the Internet 3 and the transferred image data to be projected by the projector 1. The network N in FIG. 1 refers to the first wired LAN N1 in FIG. 2. Alternatively, the network N in FIG. 1 may refer to a communication network from the first wired LAN N1 to the Internet 3, or may refer to a communication network from the first wired LAN N1 to the second wired LAN N2.

The first router device 2 and the second router device 4 are compatible with Internet Protocol version 6 (IPv6). The first router device 2 periodically transmits a router advertisement packet onto the wired LAN N1. Further, the second router device 4 periodically transmits a router advertisement packet onto the wired LAN N2. If the projector 1 receives the router advertisement packet transmitted from the first router device 2, the projector 1 generates an IPv6 automatic configuration address from prefix information attached to the router advertisement packet. Further, the projector 1 sets the expiration date of the generated IPv6 automatic configuration address from prefix expiration date information attached to the router advertisement packet. Similarly, if the PC 5 receives the router advertisement packet transmitted from the second router device 4, the PC 5 generates an IPv6 automatic configuration address from prefix information attached to the router advertisement packet and sets the expiration date of the IPv6 automatic configuration address.

The projector 1 and the PC 5 can perform network communication (communication via the network N1, the Internet 3, and the network N2) using the IPv6 automatic configuration addresses respectively generated by the projector 1 and the PC 5.

<Processing Until Projector 1 Shifts to Network Standby Mode>

In the following description, it is assumed that the projector 1 has already acquired an IPv6 automatic configuration address from the first router device 2. Further, it is assumed that the projector 1 has already finished projection, and the state where an instruction to project an image is not given is continuing now.

If the state where an instruction to project an image is not given to the projector 1 continues for a predetermined time, the mode shift control unit 19 shifts the operation mode of the projector 1 from the normal mode to the network standby mode. When performing this operation mode shift processing, the mode shift control unit 19 determines a timer value according to an IP address having the earliest expiration date among the IP addresses of the projector 1 held in the IP address management unit 15. For example, the mode shift control unit 19 determines several minutes before the expiration as a timer value, or determines a period of half the time until the expiration date as a timer value, or determines several percent of the time until the expiration date as a timer value. Then, the mode shift control unit 19 sets the wake-up timer 20 to the determined timer value. If the expiration date of the IP address is set to infinity, or if the expiration date of the IP address is set to a time having a value greater than a predetermined threshold, the mode shift control unit 19 may or may not set the wake-up timer 20. "The wake-up timer 20 is not set" means that, for example, the mode shift control unit 19 disables the timer setting of the wake-up timer 20. Further, if the expiration date of the IP address is greater than the predetermined threshold, the mode shift control unit 19 may set the expiration date to the threshold and then determine a timer value, or may not set the wake-up timer 20.

<Processing Flow in Network Standby Mode>

Figure 3:
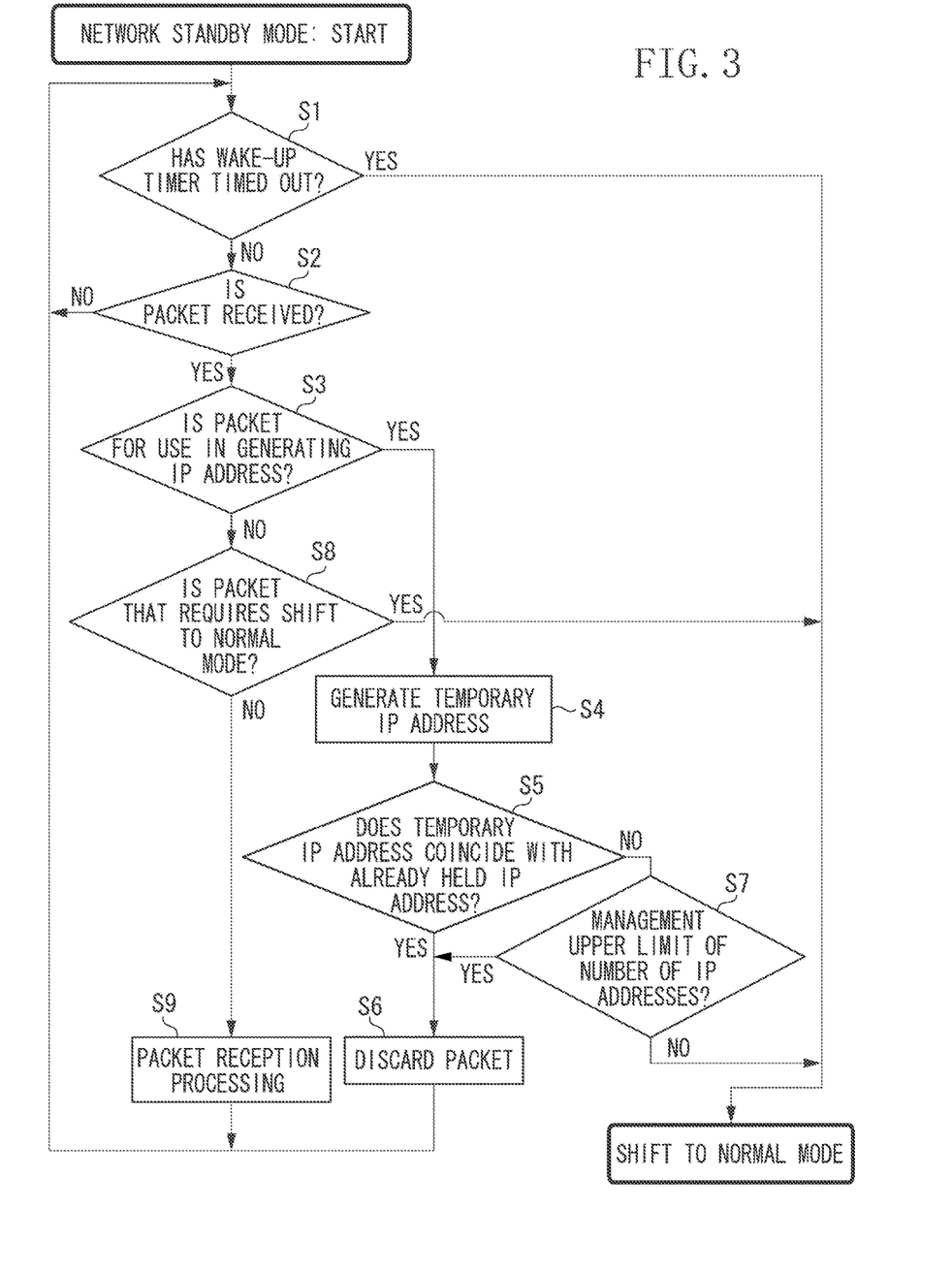
FIG. 3 is a flowchart illustrating a processing flow in a network standby mode according to one or more aspects of the present disclosure.

Based on a flowchart in FIG. 3, the processing of the projector 1 in the network standby mode will be described below.

If the projector 1 enters the network standby mode, then in step S1, the processing control unit 10 confirms whether the wake-up timer 20 has timed out. If the wake-up timer 20 has timed out (YES in step S1), the processing control unit 10 instructs the mode shift control unit 19 to shift the projector 1 from the network standby mode to the normal mode.

If the wake-up timer 20 has not timed out (NO in step S1), then in step S2, the processing control unit 10 confirms whether the network interface 36 (FIG. 5) has received a packet. If the network interface 36 has not received a packet (NO in step S2), the processing returns to step S1. In step S1, the processing control unit 10 confirms the timeout of the wake-up timer 20. If the network interface 36 has received a packet (YES in step S2), then in step S3, the network communication processing unit 13 causes the packet determination unit 14 to determine whether the received packet is a packet for use in generating an IP address. More specifically, the packet determination unit 14 determines whether the received packet is a packet for use in generating an IP address or a packet for use in updating an IP address expiration date. For example, in step S3, the packet determination unit 14 determines whether the received packet is a router advertisement packet (a type 134 packet of Internet Control Message Protocol for the Internet Protocol version 6 (ICMPv6)).

If the received packet is a packet for use in generating an IP address (YES in step S3), the processing proceeds to step S4. In step S4, the IP address management unit 15 causes the temporary IP address generation unit 17 to generate a temporary IP address. Specifically, based on prefix information attached to the router advertisement packet, the temporary IP address generation unit 17 generates an IPv6 automatic configuration address and sets the generated IPv6 automatic configuration address as a temporary IP address. The temporary IP address is an IP address generated by an IPv6 address automatic configuration function.

Next, in step S5, the IP address management unit 15 causes the IP address comparison unit 18 to determine whether the temporary IP address generated in step S4 coincides with an IP address already held as an IP address of the projector 1. This determination is made by comparing the temporary IP address generated in step S4 with an IP address already held as an IP address of the projector 1.

Although the temporary IP address and an IP address already held in the projector 1 are compared in step S5, other pieces of information may be compared. For example, prefix information attached to the router advertisement packet and part of an IP address, such as a subnet prefix portion, already held in the projector 1 may be compared to determine whether the prefix information and the part of the IP address coincide with each other. In this case, a temporary IP address need not be generated in step S4.

If an IP address that coincides with the temporary IP address is found in step S5 (YES in step S5), then in step S6, the IP address management unit 15 discards the received packet. Then, the subsequent processing on the received packet is not continued, and the processing returns to step S1. If an IP address that coincides with the temporary IP address is not found (NO in step S5), then in step S7, the IP address management unit 15 confirms the number of held IP addresses (the number of IP addresses) of the projector 1 held in the IP address management unit 15 and determines whether the number of held IP addresses has already reached a management upper limit (the upper limit of the number of IP addresses that can be held). If the number of held IP addresses has reached the management upper limit (YES in step S7), it is not possible to newly register an IP address even if the projector 1 shifts to the normal mode. Accordingly, the projector 1 does not shift to the normal mode, and the processing proceeds to step S6. In step S6, the IP address management unit 15 discards the received packet, and then, the processing returns to step S1. If the number of held IP addresses has not reached the management upper limit (the upper limit of the number of IP addresses that can be held) (NO in step S7), the mode shift control unit 19 shifts the projector 1 from the network standby mode to the normal mode. Step S7 does not necessarily have to be performed subsequent to step S5. For example, step S7 may be performed between steps S3 and S4, or may be performed between steps S4 and S5. Further, if it is determined in step S7 that the number of held IP addresses has reached the management upper limit, an IP address that is not used for a predetermined period (or the oldest IP address) among the IP addresses of the projector 1 may be deleted to reserve an area where an IP address can be held. Then, the projector 1 may shift to the normal mode.

If the received packet is not a packet for use in generating an IP address (NO in step S3), the processing proceeds to step S8. In step S8, the packet determination unit 14 determines whether the received packet is a packet that requires a shift to the normal mode. A case where it is determined that the received packet is a packet that requires a shift to the normal mode corresponds to a case where the PC 5 transmits image data to the projector 1, or a case where another apparatus transmits a packet as a wake-up trigger to the projector 1 to use the projector 1. The projector 1 can determine a wake-up condition in advance based on a protocol type and a port number. If the projector 1 receives a packet satisfying this condition, the projector 1 can determine that the received packet is a packet serving as a wake-up trigger. If it is determined in step S8 that the received packet is a packet serving as a wake-up trigger (YES in step S8), the processing control unit 10 instructs the mode shift control unit 19 to shift the projector 1 from the network standby mode to the normal mode. Further, if it is determined that the received packet is not a packet serving as a wake-up trigger (NO in step S8), then in step S9, the processing control unit 10 performs reception processing according to the received packet. Then, the processing returns to step S1.

<Processing Flow in Normal Mode>

Figure 4:
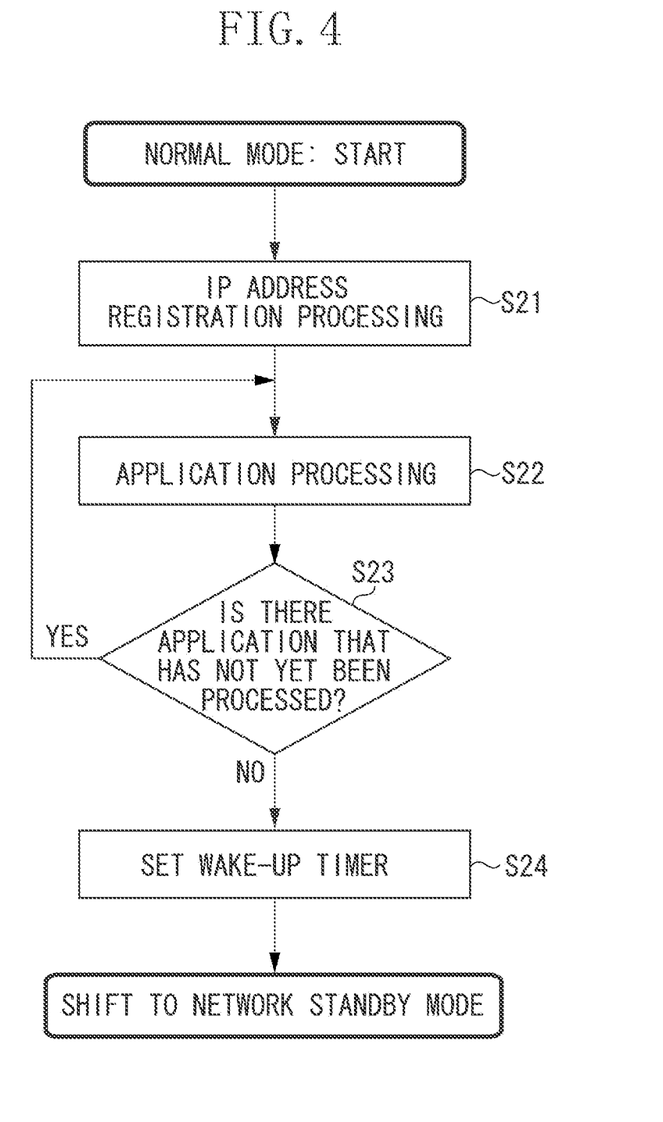
FIG. 4 is a flowchart illustrating a processing flow in a normal mode according to one or more aspects of the present disclosure.

Based on a flowchart in FIG. 4, the processing of the projector 1 in the normal mode will be described.

If the projector 1 shifts to the normal mode, then in step S21, the IP address management unit 15 causes the IP address registration unit 16 to perform IP address registration processing. Specifically, the IP address management unit 15 newly holds, as an IP address of the projector 1, the temporary IP address generated in step S4 in FIG. 3.

Then, in step S22, the application processing unit 12 performs application processing where necessary.

After the application processing ends, then in step S23, the processing control unit 10 determines whether there is an application that has not yet been processed. If there is still an application that should be processed (YES in step S23), the processing returns to step S22. In step S22, the application processing unit 12 performs application processing on this application. Then, if there is no application that should be processed (NO in step S23), then in step S24, the mode shift control unit 19 sets the wake-up timer 20 and shifts the projector 1 from the normal mode to the network standby mode.

Based on the above-mentioned flow, the projector 1 operates in either of the normal mode and the network standby mode.

<Effects of First Exemplary Embodiment>

As described above, according to the present exemplary embodiment, in step S3, the packet determination unit 14 determines whether the received packet is a packet for use in generating an IP address or a packet for use in updating an IP address expiration date. If this determination is YES, then in step S4, the temporary IP address generation unit 17 generates a temporary IP address. In step S5, the IP address comparison unit 18 determines whether the temporary IP address coincides with an IP address already held in the projector 1. Then, if this determination is YES, the projector 1 does not shift to the normal mode, and the IP address management unit 15 discards the received packet. Thus, if a router advertisement packet is received in the network standby mode, the projector 1 does not immediately shift to the normal mode, but first determines whether it is necessary to generate and register an IP address. If it is necessary to newly register an IP address, the projector 1 shifts to the normal mode. If not, the projector 1 does not shift to the normal mode, and remains in the network standby mode. Thus, the projector 1 shifts to the normal mode only if necessary. If not, the projector 1 can avoid shifting to the normal mode. By such control of the operation mode, it is possible to prevent a reduction in the power saving effects of the projector 1.

Further, even if it is determined that it is not necessary to generate an IP address (NO in step S3), then in step S8, the packet determination unit 14 determines whether the projector 1 should shift to the normal mode for a reason other than the generation of an IP address. Thus, if the projector 1 should shift to a normal mode, the projector 1 shifts to the normal mode without fail.

The present exemplary embodiment is useful particularly in a case where the projector 1 does not have the function of managing the IP address expiration date in the network standby mode.

<Hardware Configuration>

FIG. 5 illustrates the hardware configuration of the projector 1. The projector 1 includes a network communication unit 30 and an application system unit 40.

The network communication unit 30 can communicate with another communication apparatus (e.g., the PC 5 in FIG. 2) via a network. The application system unit 40 controls the network communication unit 30, thereby outputting, from a projection unit 44, image data received from another communication apparatus.

The network communication unit 30 includes a communication control unit 31, a local random-access memory (RAM) 32, a protocol processing unit 33, and a bus bridge 34. These hardware modules are connected to each other by a local bus 35. The local bus 35 is connected to a system bus 48 of the application system unit 40 by the bus bridge 34.

A network interface 36 connects the network and the projector 1 and is a terminal for physical input and output from and to the network. The network interface 36 is, for example, a wireless LAN module compatible with the wireless LAN 802.11ac standard, or a 1000BASE-T Ethernet module for a wired LAN. In the present exemplary embodiment, the network interface 36 is a 1000BASE-T Ethernet module.

The communication control unit 31 transmits and receives, for example, packets compliant with TCP/IP to and from another communication apparatus via the network. The local RAM 32 temporarily stores (buffers) data (transmission data and reception data) necessary for the communication control unit 31 to transmit and receive packets. The protocol processing unit 33 performs various types of protocol processing for performing communication compliant with TCP/IP. For example, the protocol processing unit 33 performs the header analysis of a received packet, transmission flow control, congestion control, and communication error control. Further, the protocol processing unit 33 also controls a power supply control unit 46 (described below).

The application system unit 40 includes a central processing unit (CPU) 41, a read-only memory (ROM) 42, a RAM 43, a projection unit 44, a user interface 45, a power supply control unit 46, and a clock 47. These hardware modules are connected together by the system bus 48.

The CPU 41 reads and executes a program stored in the ROM 42, thereby controlling the application system unit 40 to project an image. For example, the CPU 41 executes a program stored in the ROM 42, thereby performing the processes of the steps in FIGS. 3 and 5. The functions of the respective functional blocks in FIG. 1 are achieved by the CPU 41 executing a program stored in the ROM 42.

The RAM 43 is used as a work memory for the CPU 41 to read and execute a program. The RAM 43 stores, for example, image data before being processed by the image processing unit 11 (FIG. 1). The RAM 43 can function as an image data storage unit.

The projection unit 44 includes a lens, a light source lamp, and a liquid crystal panel. The projection unit 44 emits light from the light source lamp, passes the light through the liquid crystal panel, and projects the light from the lens.

The user interface 45 is used by the user to perform various inputs and operations. For example, the user can perform an operation such as setting the image quality of a projection image, using the user interface 45.

The power supply control unit 46 performs power supply control and reset processing on various hardware modules of the application system unit 40. Further, the power supply control unit 46 operates based on an instruction from the protocol processing unit 33.

When the projector 1 is in the normal mode, the power supply control unit 46 enters the state where power is supplied to various hardware modules of the application system unit 40. In the normal mode, the projector 1 can receive image data from another communication apparatus and project an image.

In the network standby mode, the power supply control unit 46 does not supply power to various hardware modules of the application system unit 40. In the network standby mode, the projector 1 is in a low power consumption state. In the network standby mode, the power consumption of the projector 1 is reduced as compared with the normal mode. In the network standby mode, the projector 1 cannot project image data received from another communication apparatus. However, even in the network standby mode, power is supplied to the network communication unit 30. Thus, the projector 1 can receive a request to start communication or projection, or an Address Resolution Protocol (ARP) packet from another communication apparatus via the network. The request to start communication is, for example, a connection request packet for a TCP connection (a TCP/SYN packet). If the projector 1 receives an ARP packet addressed to an IP address of the projector 1, the projector 1 notifies a partner apparatus having transmitted the ARP packet of the MAC address of the projector 1. If the projector 1 is operating in the normal mode, a program corresponding to each of the functional blocks illustrated in FIG. 1 is loaded into the RAM 43 or the local RAM 32 and executed by the CPU 41, the communication control unit 31, or the protocol processing unit 33. Then, if the projector 1 shifts to the network standby mode, the programs corresponding to the functions operable even in the network standby mode among the functional blocks illustrated in FIG. 1 are copied from the ROM 42 or the RAM 43 into the local RAM 32. Consequently, in the projector 1, part of the network communication function is operable even in the network standby mode, i.e., in the state where power is not supplied to the application system unit 40.

The hardware modules 41 to 46 may operate according to a clock signal from the clock 47.

Although a projector has been described as an example of the communication apparatus in the above exemplary embodiment, the communication apparatus according to the present disclosure is not limited to a projector. The present disclosure can be applied to any apparatus capable of operating in two or more operation modes (operation modes different in power consumption) and receiving a router advertisement packet. For example, a printing apparatus, a display apparatus, or a sound apparatus can also be used as the communication apparatus. In this case, the projection unit 44 in FIG. 5 is replaced with an output unit (e.g., a printing unit) appropriate for the output of the communication apparatus. The communication apparatus may be, for example, a camera, a smartphone, a printer, a mobile phone, a PC, a video camera, a smartwatch, or a personal digital assistant (PDA).

Further, the connection between the communication apparatus 1 and another communication apparatus may be wired or wireless, or may be a connection not via the Internet.

In step S3, it is determined whether the received packet is a packet for use in generating an IP address or a packet for use in updating an IP address expiration date. Alternatively, it may be only determined whether the received packet is a packet for use in generating an IP address.

Figure 1:
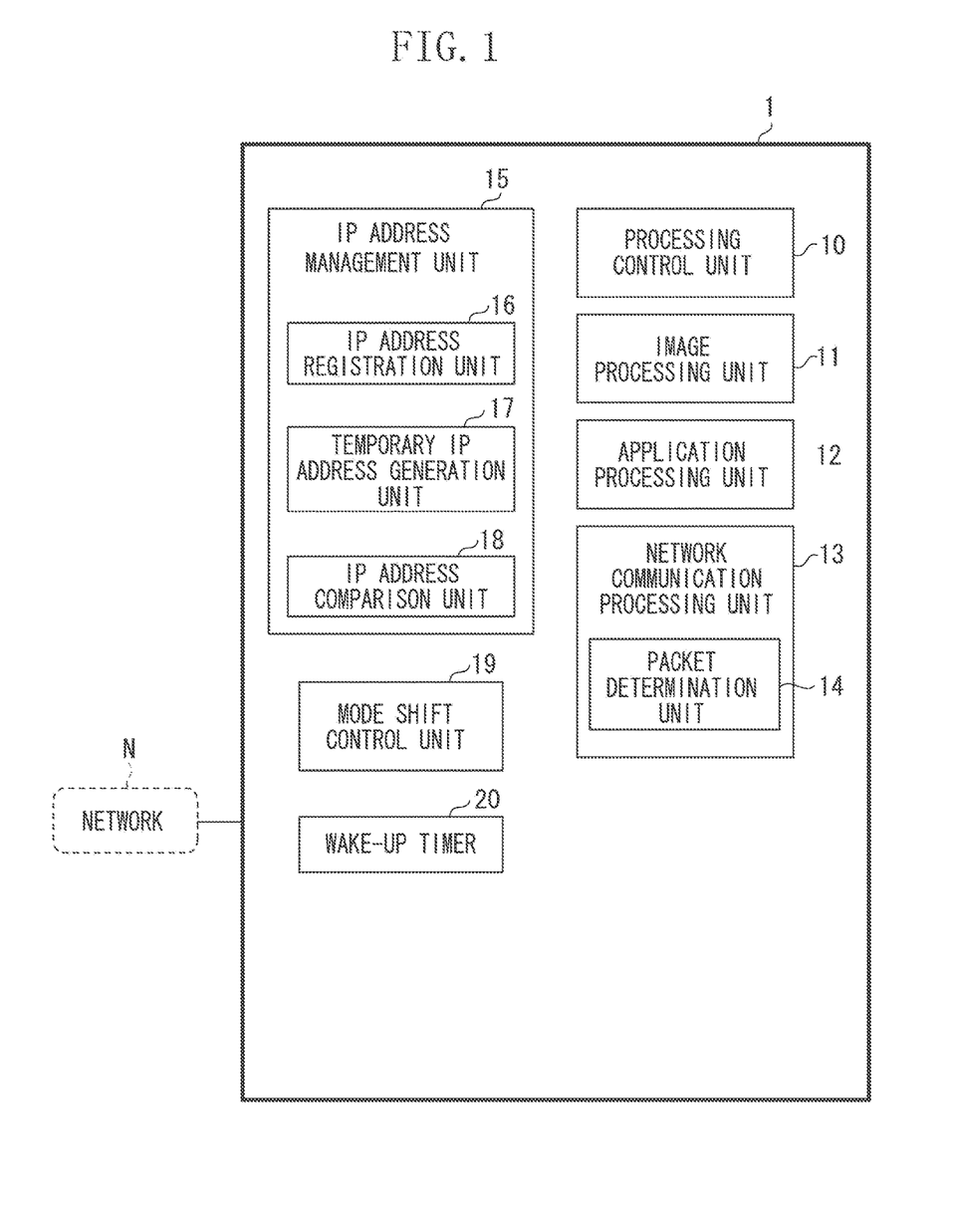
FIG. 1 is a functional block diagram of a projector according to one or more aspects of the present disclosure.

The functional blocks illustrated in FIG. 1 are merely illustrative. Alternatively, a plurality of functional blocks may be included in a single functional block, or any one of the functional blocks may be divided into blocks for performing a plurality of functions. Yet alternatively, at least one of the functional blocks may be implemented as hardware. If the functional blocks are implemented as hardware, a dedicated circuit may be automatically generated on a field-programmable gate array (FPGA) from a program for achieving each step, for example, using a predetermined compiler. Further, a gate array circuit may be formed and achieved as hardware just as in the case of the FPGA. Further, the functional blocks may be achieved by an application-specific integrated circuit (ASIC).

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2016-182954, filed Sep. 20, 2016, which is hereby incorporated by reference herein in its entirety.

What is claimed is:

1. A communication apparatus comprising:
   one or more processors; and
   one or more memories including instructions that, when executed by the one or more processors, cause the apparatus to:
   receive a packet which includes prefix information of an Internet Protocol version 6 (IPv6) address;
   generate a first IPv6 address of the communication apparatus based on the prefix information in a case where the communication apparatus receives the packet in a first operation mode in which an IPv6 address setting function is restricted;
   determine whether a second IPv6 address already set in the communication apparatus coincides with the generated first IPv6 address based on the prefix information; and
   shift from the first operation mode to a second operation mode in which the IPv6 address setting function is operable so as to make the IPv6 address setting function executable in a case where it is not determined that the second IPv6 coincides with the generated first IPv6 address,
   wherein the communication apparatus does not shift from the first operation mode to the second operation mode in a case where it is determined that the second IPv6 coincides with the generated first IPv6 address.

2. The communication apparatus according to claim 1, wherein the communication apparatus determines whether a received packet is a packet for use in generating an IPv6 address, and
   wherein the communication apparatus generates the first IPv6 address in a case where the communication apparatus determines that the received packet is a packet for use in generating an IPv6 address.

3. The communication apparatus according to claim 1, wherein the communication apparatus generates the first IPv6 address by an IPv6 address automatic configuration function.

4. The communication apparatus according to claim 1, wherein, in a case where a number of IPv6 addresses of the communication apparatus has reached an upper limit of the number of IPv6 addresses that can be held, the communication apparatus does not shift from the first operation mode to the first second operation mode even if the second IPv6 does not coincide with the generated first IPv6 address.

5. The communication apparatus according to claim 1, wherein, in a case where the number of IPv6 addresses of the communication apparatus has reached an upper limit of a number of IPv6 addresses that can be held, the communication apparatus deletes at least one of IPv6 addresses of the communication apparatus to reserve an area where the second IP address can be newly held.

6. The communication apparatus according to claim 1, further comprising a timer configured to notify the communication apparatus that a time to shift from the first operation mode to the second operation mode has arrived.

7. The communication apparatus according to claim 6, wherein the communication apparatus sets the timer to a time determined according to an IPv6 address expiration date.

8. The communication apparatus according to claim 6, wherein the communication apparatus disables a setting of the timer in a case where the timer is set to infinity or a time having a value greater than a predetermined threshold.

9. The communication apparatus according to claim 6, wherein the communication apparatus sets a predetermined value to the timer in a case where the timer is set to infinity or a time having a value greater than a predetermined threshold.

10. The communication apparatus according to claim 1, wherein the received packet which includes the prefix information is a router advertisement packet or an Internet Control Message Protocol for the Internet Protocol version 6 (ICMPv6) packet a type of which is 134.

11. The communication apparatus according to claim 1, wherein the communication apparatus consumes larger power when operating in the second operation mode than in the first operation mode.

12. The communication apparatus according to claim 1, wherein the communication apparatus sets an address of the communication apparatus to the generated first IPv6 address after shifting from the first operation mode to the second operation mode.

13. A control method for controlling a communication apparatus, the control method comprising:
  receiving a packet which includes prefix information of an Internet Protocol version 6 (IPv6) address;
  generating a first IPv6 address of the communication apparatus based on the prefix information in a case where the communication apparatus receives the packet in a first operation mode in which an IPv6 address setting function is restricted;
  determining whether a second IPv6 address already set in the communication apparatus coincides with the generated first IPv6 address based on the prefix information; and
  shifting from the first operation mode to a second operation mode in which the IPv6 address setting function is operable so as to make the IPv6 address setting function executable in a case where it is not determined that the second IPv6 coincides with the generated first IPv6 address,
  wherein the communication apparatus does not shift from the first operation mode to the second operation mode in a case where it is determined that the second IPv6 coincides with the generated first IPv6 address.

14. A non-transitory computer-readable storage medium storing therein a program for causing a control device for controlling a communication apparatus, to execute:
  receiving a packet which includes prefix information of an Internet Protocol version 6 (IPv6) address;
  generating a first IPv6 address of the communication apparatus based on the prefix information in a case where the communication apparatus receives the packet in a first operation mode in which an IPv6 address setting function is restricted;
  determining whether a second IPv6 address already set in the communication apparatus coincides with the generated first IPv6 address based on the prefix information; and
  shifting from the first operation mode to a second operation mode in which the IPv6 address setting function is operable so as to make the IPv6 address setting function executable in a case where it is not determined that the second IPv6 coincides with the generated first IPv6 address,
  wherein the communication apparatus does not shift from the first operation mode to the second operation mode in a case where it is determined that the second IPv6 coincides with the generated first IPv6 address.

* * * * *